US010194123B2

(12) United States Patent
Shitomi

(10) Patent No.: US 10,194,123 B2
(45) Date of Patent: Jan. 29, 2019

(54) BOUNDARY TIMING CONTROLLER FOR DISPLAY APPARATUS

(71) Applicant: Takayuki Shitomi, Tokyo (JP)

(72) Inventor: Takayuki Shitomi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/699,698

(22) Filed: Sep. 8, 2017

(65) Prior Publication Data

US 2018/0070062 A1 Mar. 8, 2018

(30) Foreign Application Priority Data

Sep. 8, 2016 (JP) ................................ 2016-175684
Jul. 7, 2017 (JP) ................................ 2017-133642

(51) Int. Cl.
*H04N 9/31* (2006.01)
*G02B 27/01* (2006.01)
(Continued)

(52) U.S. Cl.
CPC ......... *H04N 9/3155* (2013.01); *G02B 26/023* (2013.01); *G02B 27/0101* (2013.01); *G03B 21/2053* (2013.01); *G09G 3/025* (2013.01); *H04N 5/06* (2013.01); *H04N 9/3129* (2013.01); *H04N 9/3194* (2013.01); *G02B 5/205* (2013.01); *G02B 2027/0118* (2013.01); *G09G 2320/0633* (2013.01); *G09G 2360/14* (2013.01)

(58) Field of Classification Search
CPC .................................................... H04N 9/3129
USPC ........................................................ 348/115
See application file for complete search history.

(56) References Cited

U.S. PATENT DOCUMENTS 6,114,813 A * 9/2000 Lo ...................... H05B 37/0218
250/214 AL
8,077,276 B2 * 12/2011 Uchida ............. G02F 1/133553
349/114
(Continued)

FOREIGN PATENT DOCUMENTS

EP 0 749 249 A1 12/1996
EP 2 785 060 A1 10/2014
(Continued)

OTHER PUBLICATIONS

Extended European Search Report dated Nov. 10, 2017 in Patent Application No. 17189956.0, 12 pages.

*Primary Examiner* — Paulos M Natnael
(74) *Attorney, Agent, or Firm* — Oblon, McClelland, Maier & Neustadt, L.L.P.

(57) ABSTRACT

A display apparatus includes: a light source to emit light; a dimming unit including a plurality of regions having transmittances that are mutually different from one another; a switching unit to switch a region of the dimming unit through which the light passes, between the plurality of regions of the dimming unit; a scanning unit to scan a scan area at a predetermined frame rate with the light, the scan area having a first area in which an image is formed and a second area different from the first area; a sensor to detect a light amount of the light emitted to the second area; and a controller to determine a boundary timing at which the light has passed through a boundary portion between two adjacent regions of the dimming unit based on characteristics of a temporal change in the detected light amount.

11 Claims, 12 Drawing Sheets

(51) Int. Cl.
    *H04N 5/06*         (2006.01)
    *G03B 21/20*       (2006.01)
    *G09G 3/02*         (2006.01)
    *G02B 26/02*       (2006.01)
    *G02B 5/20*         (2006.01)

(56) References Cited

U.S. PATENT DOCUMENTS

| | | | |
|---|---|---|---|
| 9,575,587 | B2* | 2/2017 | O'Keeffe ............... G06F 1/3262 |
| 2006/0203154 | A1* | 9/2006 | Uchida ............. G02F 1/133553 |
| | | | 349/114 |
| 2011/0075104 | A1 | 3/2011 | Sakakibara et al. |
| 2012/0217889 | A1* | 8/2012 | Jayabalan .......... H05B 33/0815 |
| | | | 315/209 R |
| 2013/0293134 | A1* | 11/2013 | Ishikita .............. H05B 33/0866 |
| | | | 315/210 |
| 2014/0152711 | A1* | 6/2014 | Sekiya ................... G02B 27/01 |
| | | | 345/690 |
| 2015/0260984 | A1* | 9/2015 | Yamakawa .......... H04N 9/3129 |
| | | | 345/591 |
| 2017/0017324 | A1* | 1/2017 | O'Keeffe ............... G06F 1/3262 |

FOREIGN PATENT DOCUMENTS

| | | |
|---|---|---|
| JP | 2007-003687 | 1/2007 |
| JP | 2014-053869 | 3/2014 |
| JP | 2014-194493 | 10/2014 |
| JP | 2014-197057 | 10/2014 |
| JP | 2017-021131 | 1/2017 |
| WO | WO 2014/013144 A1 | 1/2014 |

\* cited by examiner

BOUNDARY TIMING CONTROLLER FOR DISPLAY APPARATUS

CROSS-REFERENCE TO RELATED APPLICATIONS

This patent application is based on and claims priority pursuant to 35 U.S.C. § 119(a) to Japanese Patent Application Nos. 2016-175684, filed on Sep. 8, 2016, and 2017-133642, filed on Jul. 7, 2017, in the Japan Patent Office, the entire disclosure of which is hereby incorporated by reference herein.

BACKGROUND

Technical Field

The present invention relates to a display apparatus, a moving body, a display method, and a non-transitory recording medium.

Description of the Related Art

The display apparatuses such as a projector, a heads-up display, and the like display an image using a laser scanning method. In the laser scanning method, the image is displayed on a predetermined screen by repeatedly scanning a predetermined scan area with scanning light such as a laser beam. In such a display apparatus, the brightness of a target image is adjusted, by changing the output of the scanning light, or controlling a neutral density filter to decrease the light amount of the transmitted scanning light.

SUMMARY

Example embodiments of the present invention include a display apparatus including: a light source to emit light; a dimming unit including a plurality of regions having transmittances that are mutually different from one another; a switching unit to switch a region of the dimming unit through which the light passes, between the plurality of regions of the dimming unit; a scanning unit to scan a scan area at a predetermined frame rate with the light, the scan area having a first area in which an image is formed and a second area different from the first area; a sensor to detect a light amount of the light emitted to the second area; and a controller to determine a boundary timing at which the light has passed through a boundary portion between two adjacent regions of the dimming unit based on characteristics of a temporal change in the detected light amount.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings.

Figure 1:
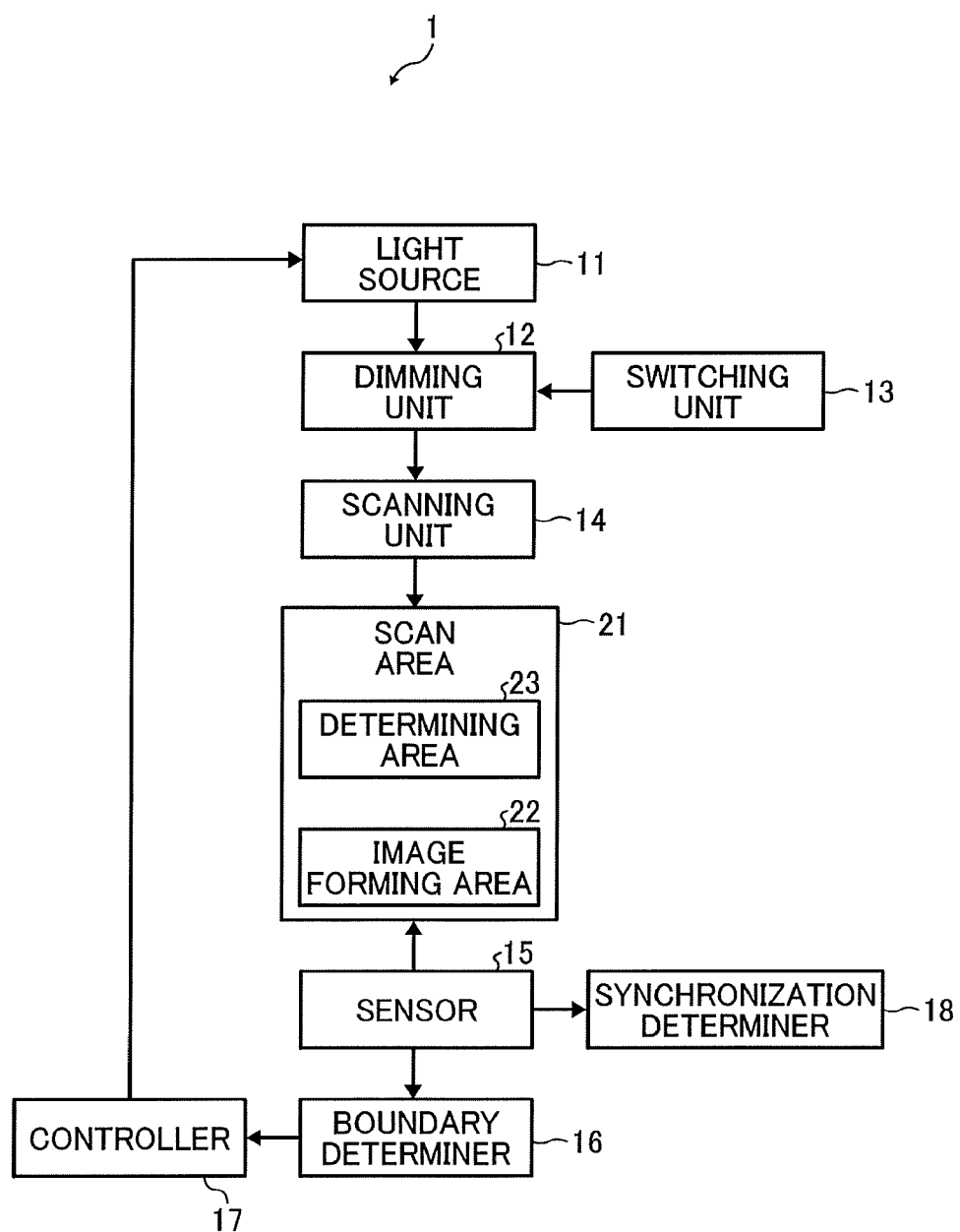
FIG. 1 is a block diagram illustrating a functional configuration of a display apparatus according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In the case of adjusting the light amount of the scanning light using the neutral density filter, when switching the neutral density filter arranged on the optical path of the scanning light (when changing a plurality of neutral density filters having mutually different transmittances, when inserting/extracting one neutral density filter, or the like), the light amount of the scanning light sharply changes.

A sudden change in the light amount of the scanning light causes a sudden change in the brightness of the image and becomes a factor of giving a displeasing feeling to the user viewing the image. The adjustment of the light amount of the scanning light is not dependent only on the switching of the neutral density filter but by gradually changing the light amount of the scanning light by the output control of the light source, for example, so that such a problem can be alleviated. However, in order to achieve such control, it is necessary to detect the time at which the light amount changes with high accuracy by switching the neutral density filter.

In view of the above, it is desirable to detect the time at which the light amount changes due to switching of the neutral density filter with high accuracy.

Hereinafter, embodiments of a display apparatus, a display method, and a moving body will be described in detail with reference to the accompanying drawings.

FIG. 1 is a block diagram illustrating a configuration of a control section of a display apparatus 1 according to an embodiment. The display apparatus 1 according to the present embodiment displays an image by a laser scanning method, and may be, for example, a projector, a heads-up display, or the like. In the laser scanning method, an image is displayed on a predetermined screen by repeatedly scanning a predetermined area 21 to be scanned ("scan area 21") with scanning light such as a laser beam.

The display apparatus 1 includes a light source 11, a dimming unit 12, a switching unit 13, a scanning unit 14, a sensor 15, a boundary determiner 16 (first determiner), a controller 17, and a synchronization determiner 18 (second determiner).

The light source 11 outputs a laser beam as scanning light. The light source 11 may be configured by a light emitting element such as a light emitting diode (LED), a power supply to supply a current to the light emitting element, an optical element to reflect, condense, or collimate the output laser beam. The specific configuration of the light source 11 is not particularly limited to the one described herein.

The dimming unit 12 decreases the light amount of the laser beam output from the light source 11. The dimming unit 12 has a plurality of regions having mutually different transmittances. This region is formed by using such as a neutral density (ND) filter, for example. The specific configuration of the dimming unit 12 is not particularly limited to the one described herein.

The switching unit 13 switches the region in the dimming unit 12 through which the laser beam output from the light source 11 passes, based on a predetermined condition. The switching unit 13 switches the region through which a laser beam passes, for example, by switching between a plurality of types of neutral density filters by causing one neutral density filter to be placed on the optical path. The switching unit 13 may be configured by, for example, an electric motor, a link mechanism, a control unit to control the electric motor, and the like. The specific configuration of the switching unit 13 is not particularly limited to the one described herein.

The scanning unit 14 scans the scan area 21 with the laser beam output from the light source 11. The scanning unit 14 scans the scan area 21 a plurality of times at a predetermined frame rate. The scanning unit 14 may be configured by an optical element such as a mirror and a lens, and micro electro mechanical systems (MEMS) to displace an optical element. The specific configuration of the scanning unit 14 is not particularly limited to the one described herein.

The scan area 21 is a predetermined area on a screen made of a predetermined material, as an area to be irradiated with a laser beam whose emission direction is adjusted by the scanning unit 14. The scan area 21 according to the present embodiment includes an image forming area 22 (first area) where an image is formed and a determining area 23 (second area) different from the image forming area 22.

The sensor 15, provided in the determining area 23, detects the light amount of the laser beam emitted to the determining area 23. The sensor 15 can be configured by, for example, a photoelectric conversion element, an amplifier circuit, or the like. The specific configuration of the sensor 15 is not particularly limited to the one described herein. It should be noted that the sensor 15 is not necessarily provided in the determining area 23 in the scan area 21 but may be provided anywhere on the optical path as long as the light amount of the laser beam emitted to the determining area 23 can be detected.

Based on characteristics of the temporal change in the light amount detected by the sensor 15, the boundary determiner 16 determines a timing (hereinafter referred to as boundary timing) at which the laser beam passes through a boundary portion between two regions having mutually different transmittances in the dimming unit 12. A specific determination method of the boundary timing based on the temporal characteristics of the change in light amount will be described in detail later. The boundary determiner 16 may be configured by, for example, a central processing unit: processor (CPU) that operates according to a program stored in a memory, various logic circuits, and the like. The specific configuration of the boundary determiner 16 is not particularly limited to the one described herein.

The controller 17 controls the output of the light source 11 so that the light amount of the laser beam emitted to the image forming area 22 matches transmittance of the dimming unit 12 based on the boundary timing determined by the boundary determiner 16. The controller 17 can be configured by using, for example, a CPU that operates according to a program stored in a memory, various logic circuits, and the like. The controller 17 may control not only the output of the light source 11 but also other processing (for example, image forming processing, switching processing of the dimming unit 12, laser beam scanning processing, and the like) executed by the display apparatus 1. The specific configuration of the controller 17 is not particularly limited to the one described herein.

The synchronization determiner 18 determines a synchronization timing of each frame based on the detection result of the sensor 15. The synchronization timing is information indicating the timing uniquely corresponding to each frame. The synchronization timing of each frame is monitored, for example, to check whether the scanning unit 14 normally operates, or image forming processing is performed with high accuracy. The synchronization determiner 18 can be configured by, for example, a CPU that operates according to a program stored in a memory, various logic circuits, and the like. The specific configuration of the synchronization determiner 18 is not particularly limited to the one described herein.

According to the display apparatus 1, the boundary timing is determined based on characteristics of the temporal change in the light amount of the laser beam detected in the determining area 23. This enables the display apparatus 1 to detect the timing at which the light amount of the laser beam changes by the switching of the neutral density filter, thus improving image forming processing.

Figure 2:
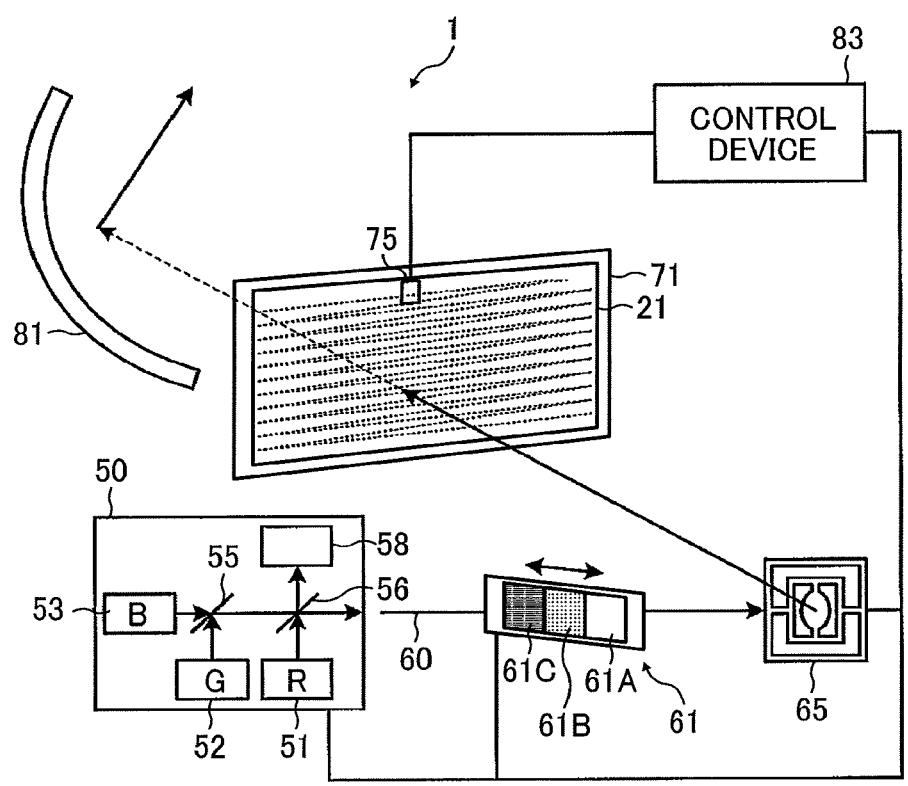
FIG. 2 is a diagram illustrating a hardware configuration of a display apparatus according to the embodiment.

FIG. 2 is a diagram illustrating a hardware configuration of the display apparatus 1 according to an example of the embodiment. The display apparatus 1 according to the present embodiment includes a light source 50, a filter unit 61, a MEMS mirror 65, a screen 71, a photosensor 75, a concave mirror 81, and a control device 83.

The light source 50, which corresponds to the light source 11, outputs a laser beam 60. The light source 50 includes a red LED 51, a green LED 52, a blue LED 53, dichroic mirrors 55 and 56, and a color sensor 58. The red LED 51 outputs a red laser beam. The green LED 52 outputs a green laser beam. The blue LED 53 outputs a blue laser beam. The dichroic mirrors 55 and 56 reflect and transmit the laser beams of the respective colors output from the LEDs 51 to 53 at a predetermined ratio, thereby converging the laser beam of each color into one laser beam 60. A part of the aggregated laser beam 60 is received by the color sensor 58. The color sensor 58 converts each of the red, green, and blue laser beams into an electric signal, and the electric signal is output to the control device 83 that controls entire operation of the display apparatus 1. The output (light amount), color, and the like of the laser beam 60 are controlled by the control device 83.

The filter unit 61, as the dimming unit 12, includes a plurality of filters 61A, 61B, and 61C (neutral density filter) having mutually different transmittances and can arbitrarily switch the filters 61A, 61B, and 61C through which the laser beam 60 passes. The filter unit 61 according to the present embodiment includes three types of ND type filters 61A, 61B, and 61C. When the transmittance of the first filter 61A is T1, the transmittance of the second filter 61B is T2, and the transmittance of the third filter 61C is T3, the relation of T1>T2>T3 holds. Three regions having mutually different transmittances are formed by the first to third filters 61A to 61C. The filters 61A, 61B, and 61C according to the present embodiment are disposed in the horizontal direction in a manner that is slide-able in the horizontal direction. According to the control signal from the control device 83, the filters 61A, 61B, and 61C slide such that one filter to be disposed on the optical path of the laser beam 60 is switched.

The MEMS mirror 65, as the scanning unit 14, irradiates the screen 71 with the laser beam 60 passing through any of the filters 61A, 61B, and 61C. The MEMS mirror 65 operates so that the scan area 21 set on the screen 71 is scanned by the laser beam 60. The operation of the MEMS mirror 65 is controlled by the control device 83.

As the scan area 21 on the screen 71 is repeatedly scanned with the laser beam 60 at a predetermined frame rate, images (including moving images and still images) are displayed on the screen 71. The screen 71 according to this embodiment is made of a transparent material. Therefore, the image (the emitted laser beam 60) displayed on the screen 71 passes through the rear surface of the screen 71 (the surface opposite to the surface irradiated with the laser beam 60). On the back side of the screen 71, the concave mirror 81 is disposed. The concave mirror 81 reflects the laser beam 60 passing through the screen 71 and projects the image displayed on the screen 71 onto a predetermined portion, for example, a windshield of a vehicle, a large screen, or the like.

The photosensor 75, as the sensor 15, is provided on the screen 71. The photosensor 75 outputs a current corresponding to the light amount of the laser beam 60 emitted onto the screen 71 from the MEMS mirror 65. The current output from the photosensor 75 is input to the control device 83 and used for controlling image forming processing, output processing of the laser beam 60, the scanning processing, and the like.

The control device 83 controls the display apparatus 1, and is configured by a CPU, a read only memory (ROM), a random access memory (RAM), an application specific integrated circuit (ASIC), or the like. The CPU performs overall control of the display apparatus 1, and performs predetermined control calculation processing using the RAM as a working area for the control program stored in the ROM. The ASIC is an integrated circuit (IC) for a specific application such as image forming processing. The control device 83 corresponds to the controller 17, boundary determiner 16, synchronization determiner 18.

FIG. 3 is a diagram illustrating a configuration of the filter unit 61 according to the embodiment. The filter unit 61 according to the present embodiment includes three types of filters 61A, 61B, and 61C, a frame body 62, a rod-like member 63, and a driving unit 64.

The filters 61A, 61B, and 61C are accommodated inside the frame body 62. The frame body 62 is attached to the rod-like member 6. The rod-like member 63 is coupled to the driving unit 64. The driving unit 64 causes the frame body 62 to slide along the rod-like member 63 in the horizontal direction, that is, along the arrangement direction of the filters 61A, 61B, and 61C by a power source such as an electric motor. The operation of the driving unit 64 is controlled by the control device 83. By the operation of the driving unit 64, one of the filters 61A, 61B, and 61C to be arranged on the optical path of the laser beam 60 is switched.

Figure 3A:
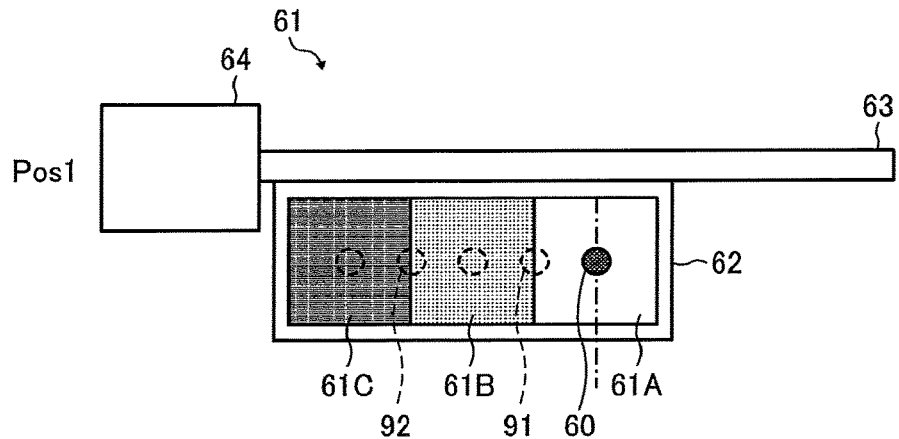
FIGS. 3A to 3C (FIG. 3) are a diagram illustrating a configuration of a filter unit according to the embodiment.
Figure 3B:
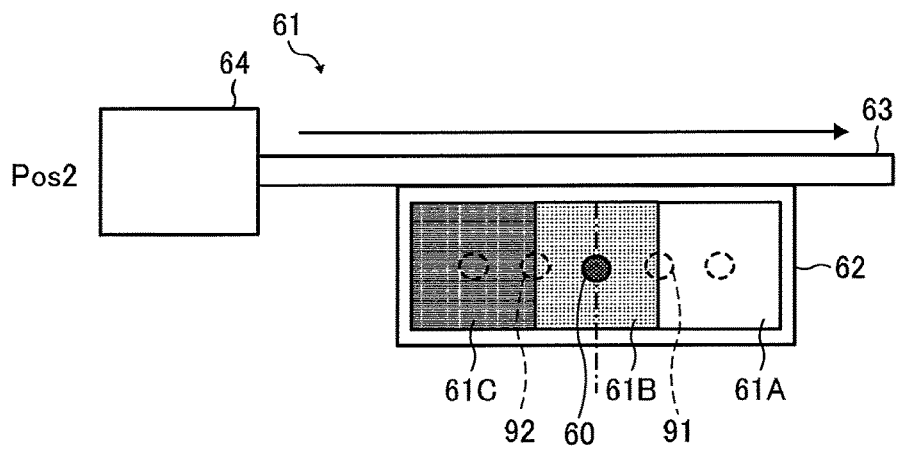
Figure 3C:
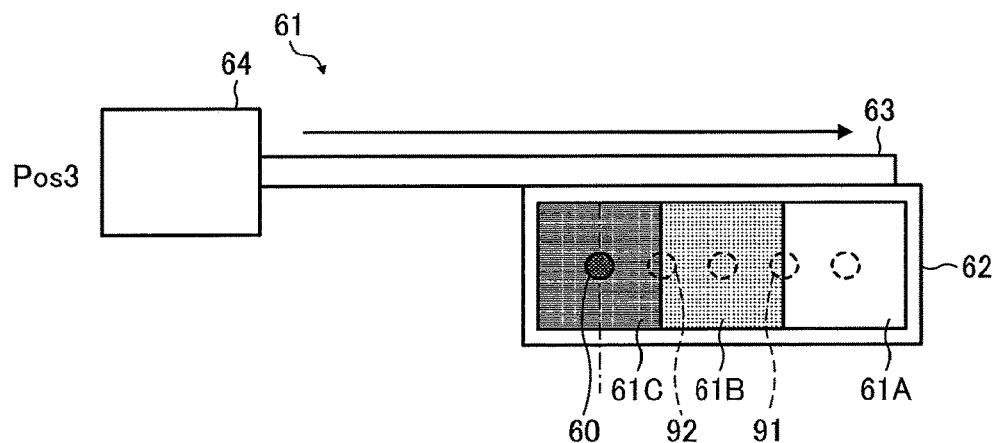

FIG. 3 illustrates three positions of the frame body 62 along the horizontal direction. A first position (Pos1), illustrated in FIG. 3A, indicates a state in which the central portion of the first filter 61A having the highest transmittance T1 is positioned on the optical path of the laser beam 60. A second position (Pos2), illustrated in FIG. 3B, indicates a state in which the central portion of the second filter 61B having the intermediate transmittance T2 is positioned on the optical path of the laser beam 60. A third position (Pos3), illustrated in FIG. 3C, indicates a state in which the central portion of the third filter 61C having the lowest transmittance T3 is positioned on the optical path of the laser beam 60.

A boundary portion 91 between the first filter 61A and the second filter 61B passes over the optical path of the laser beam 60 while shifting from Pos1 to Pos2. The boundary portion 92 between the second filter 61B and the third filter 61C passes over the optical path of the laser beam 60 while shifting from Pos2 to Pos3. When these boundary portions 91 and 92 pass over the optical path of the laser beam 60, the light amount of the laser beam 60 emitted to the screen 71 abruptly changes. This also applies to a shift from Pos3 to Pos2 and a shift from Pos2 to Pos1.

FIG. 4 is a diagram illustrating a configuration of a filter unit 61a according to another example of the embodiment. The filter unit 61a, as the dimming unit 12, according to the present embodiment includes one type of filter 61D (neutral density filter), a transmission area 66, the frame body 62, the rod-like member 63, and the driving unit 64. The filter 61D has a predetermined transmittance (transmittance exhibiting a dimming effect), and is provided inside the frame body 62. The transmission area 66 corresponds to a hollow area, surrounded by the frame body 22. Two regions having mutually different transmittances are formed by the filter 61D and the transmission area 66.

The frame body 62 is attached to the rod-like member 63. The rod-like member 63 is coupled to the driving unit 64. The driving unit 64 slides the frame body 62 in the horizontal direction, that is, along the arrangement direction of the filter 61D and the transmission area 66 by a power source such as an electric motor. The operation of the driving unit 64 is controlled by the control device 83. By the operation of the driving unit 64, one of the filter 61D and the transmission area 66 to be arranged on the optical path of the laser beam 60 is switched.

Figure 4A:
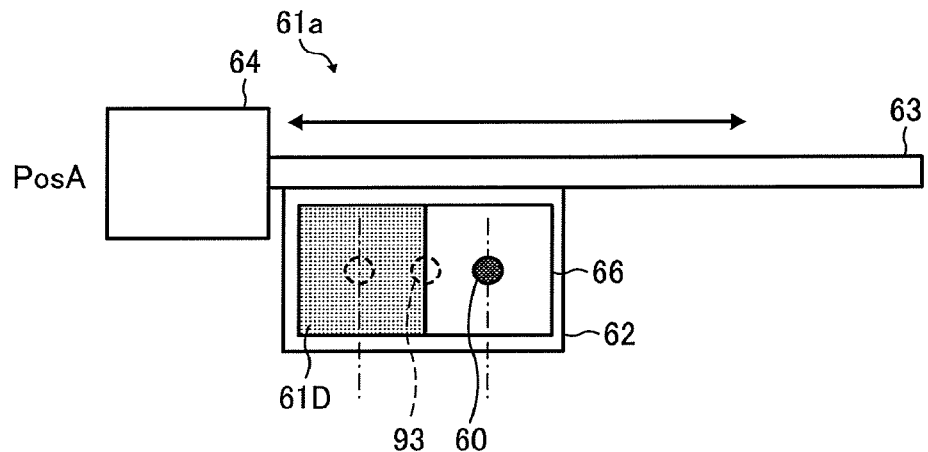
FIGS. 4A to 4C (FIG. 4) are a diagram illustrating a configuration of a filter unit according to another example of the embodiment.
Figure 4B:
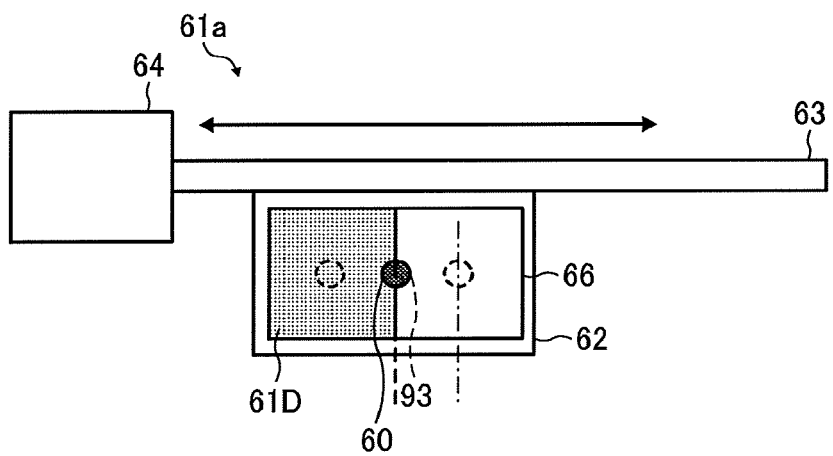
Figure 4C:
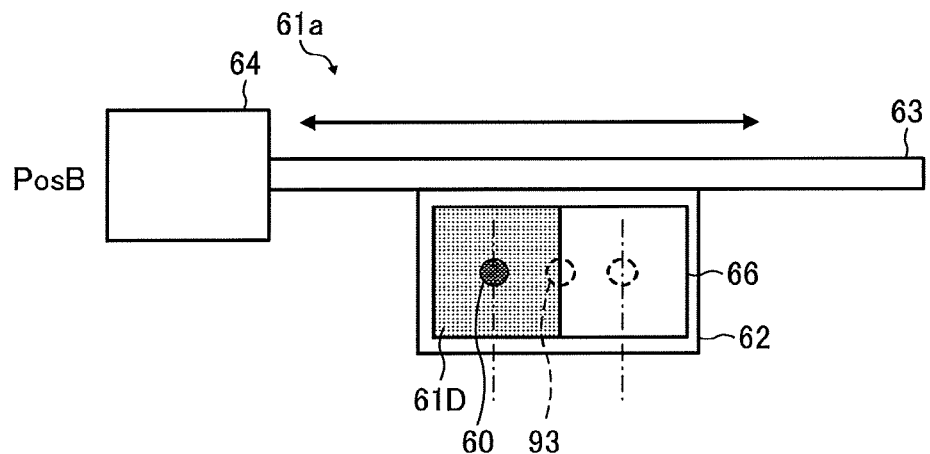

FIG. 4 illustrates two positions of the frame body 62 along the horizontal direction. A first position (PosA), illustrated in FIG. 4A, indicates a state in which the central portion of the transmission area 66 is positioned on the optical path of the laser beam 60. A second position (PosB), illustrated in FIG. 4C, indicates a state in which the central portion of the filter 61D is positioned on the optical path of the laser beam 60. As illustrated in FIG. 4B, the boundary portion 93 between the transmission area 66 and the filter 61D passes over the optical path of the laser beam 60 while shifting from PosA to PosB or PosB to PosA. When this boundary portion 93 passes over the optical path of the laser beam 60, the light amount of the laser beam 60 emitted to the screen 71 abruptly changes.

As in the filter unit 61a illustrated in FIG. 4, by using the transmission area 66 instead of the neutral density filter, the product can be manufactured at low cost. Note that a transparent substrate made of glass or the like may be used instead of the transmission area 66, which is a hollow portion. In the case of using the neutral density filter and the transmission area 66, there is a case where a difference in optical conditions occurs between the neutral density filter and the transmission area 66 due to the light refraction or the like of the neutral density filter. However, by using a transparent substrate, it is possible to alleviate such a difference in optical conditions.

In the above description, the configuration using the three kinds of filters 61A to 61C (FIG. 3) and the configuration using the transmission area 66 (FIG. 4) are described as the configuration example of the dimming unit 12. However, the configuration of the dimming unit 12 is not limited to these configurations. For example, a combination of both configurations, a configuration using more various neutral density filters, or the like may be used.

Figure 5:
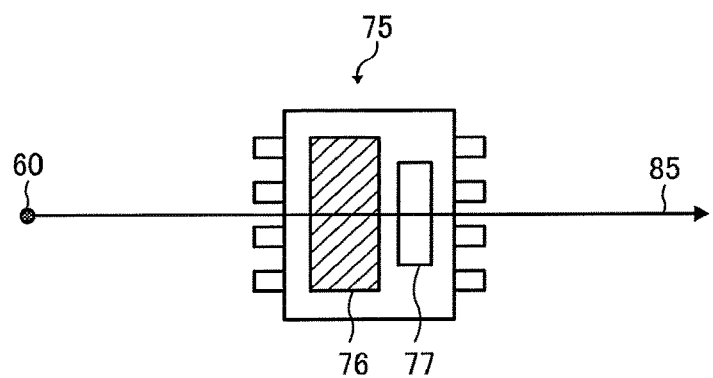
FIG. 5 is a diagram illustrating a configuration of a photosensor according to the embodiment.

FIG. 5 is a diagram illustrating a configuration of the photosensor 75 according to the embodiment. The photosensor 75 includes a photo diode (PD) 76 and an amplifier circuit 77. The PD 76 is a semiconductor device which outputs an electric signal corresponding to the light amount of the received light. When the laser beam 60 moves in the scanning direction 85 and passes over the PD 76, an electric signal corresponding to the light amount of the laser beam 60 is output from the PD 76. The amplifier circuit 77 amplifies the electric signal output from the PD 76 and outputs the amplified electric signal to the control device 83.

Figure 6:
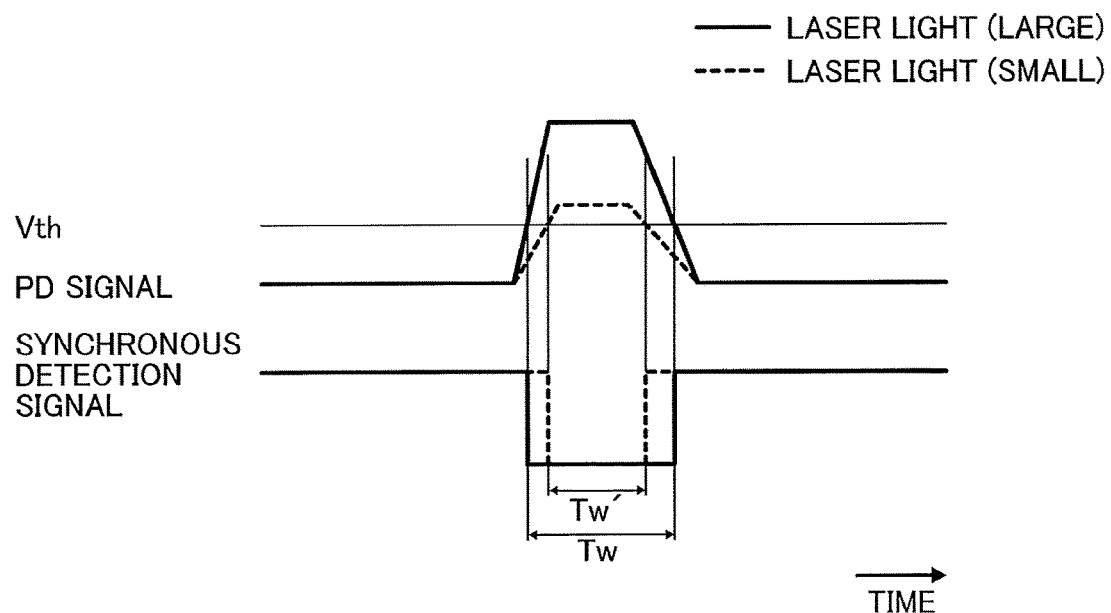
FIG. 6 is a timing chart illustrating a PD signal and a synchronization detection signal according to the embodiment.

FIG. 6 is a timing chart illustrating a PD signal and a synchronization detection signal according to the embodiment. The PD signal is the electric signal output from the PD 76, indicating the change in potential. When the laser beam 60 passes over the PD 76 in the process of scanning the laser beam 60, the potential rises in accordance with the light amount of the laser beam 60. The synchronization detection signal is a signal which becomes H (High) when the potential of the PD signal is equal to a threshold potential Vth and becomes L (Low) when the potential of the PD signal is equal to or higher than the threshold potential Vth. The control device 83 monitors the synchronization detection signal, to determine the synchronization timing of each frame. That is, by monitoring the synchronization timing of each frame, it is possible to determine whether the scanning process normally operates, thus, improving the accuracy in image formation.

In FIG. 6, a solid signal line indicates a signal in the case where the light amount of the laser beam 60 is relatively large, and a broken signal line indicates a signal in the case where the light amount of the laser beam 60 is relatively small. The rate of change (the amount of change in the potential per unit time) of the PD signal is larger when the light amount is larger than when the light amount is small. Accordingly, a pulse width Tw of the synchronization detection signal when the light amount is large is larger than a pulse width Tw' of the synchronization detection signal when the light amount is small.

Figure 7:
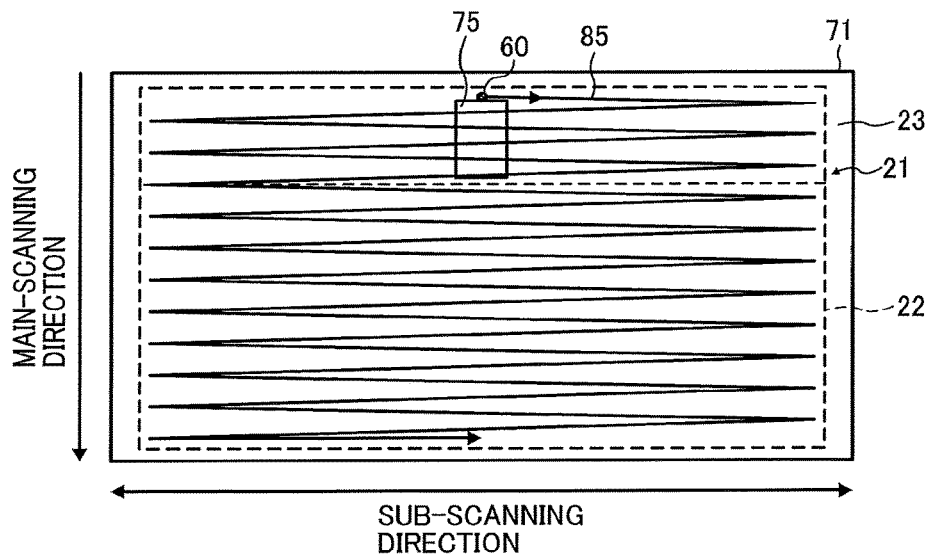
FIG. 7 is a diagram illustrating a configuration of a scan area according to the embodiment.

FIG. 7 is a diagram illustrating a configuration of the scan area 21 according to the embodiment. The scan area 21 is a region irradiated with the laser beam 60. The laser beam 60 scans the scan area 21 in a predetermined scanning direction 85. In the scanning direction 85 according to the present embodiment, an upper end portion of the scan area 21 is defined as a start point, and a lower end portion is defined as an end point. While scanning the scan area 21 once in the main scanning direction, the laser beam 60 scans the scan area 21 a plurality of times while vibrating in the sub scanning direction. When the laser beam 60 reaches the end point, scanning is started again from the start point. One frame is formed by one scan from the start point to the end point, and one image (still image) is formed by one frame. A predetermined image is formed on the screen 71 by performing a plurality of scans (forming a plurality of frames) at a predetermined frame rate.

The scan area 21 includes the image forming area 22 and the determining area 23. The image forming area 22 is an area where an image is formed. The determining area 23 is an area used for determining synchronization timing and boundary timing of each frame. The boundary timing is a timing at which the filters 61A, 61B, and 61C are switched, that is, a timing at which the laser beam 60 passes through the boundary portions 91 and 92 of the respective filters 61A, 61B, and 61C. In the present embodiment, the determining area 23 is located on the upstream side of the image forming area 22 in the scanning direction 85. An image is not normally displayed in the determining area 23. The photosensor 75 is disposed in the determining area 23. In the present embodiment, in one frame, the laser beam 60 scans the photosensor 75 five times. As a result, a maximum of five data items indicating the light amount of the laser beam 60 is acquired in one frame.

Figure 8:
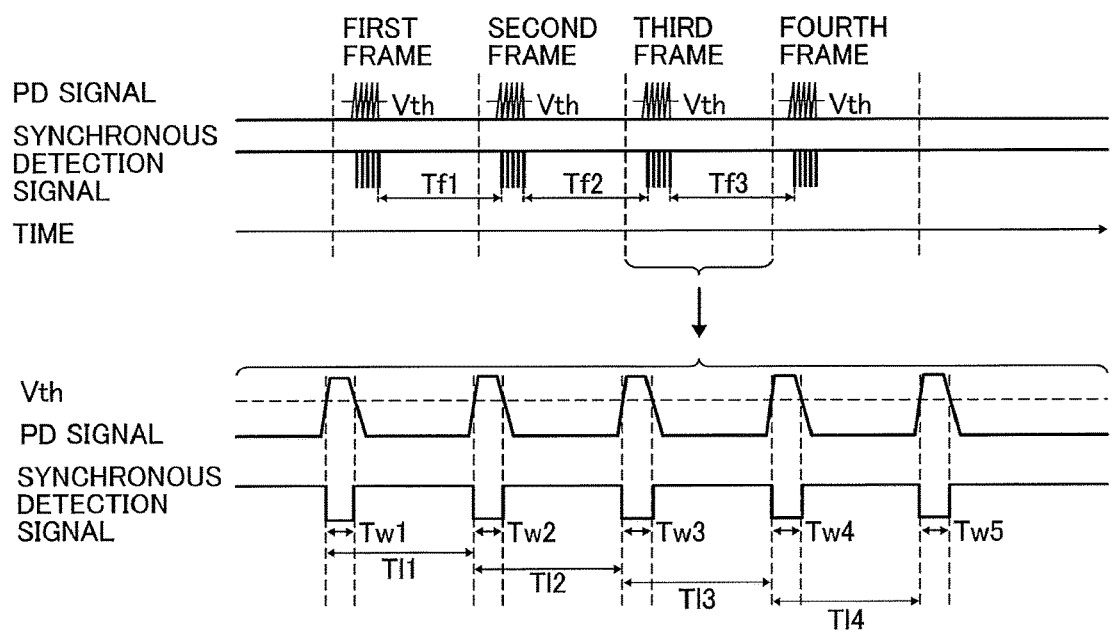
FIG. 8 is a timing chart illustrating a PD signal and a synchronization detection signal in a case where the position of the filter unit does not shift in the embodiment.

FIG. 8 is a timing chart illustrating a PD signal and a synchronization detection signal in a case where the position of the filter unit 61 does not shift in the embodiment. The upper part in FIG. 8 illustrates the PD signal and the synchronization detection signal between the plurality of frames, and the lower part in FIG. 8 illustrates the PD signal and the synchronization detection signal in one frame (third frame).

As illustrated in FIG. 8, five rising edges of the PD signal are detected in each frame. This is because the photosensor 75 is scanned five times in each frame. In this embodiment, since all the potentials of these five rising edges are equal to or larger than the threshold potential Vth, five synchronization detection signals are detected.

The upper part in FIG. 8 illustrates five rising edges of the PD signal for each frame and five synchronization detection signals per frame. When the scanning control of the laser beam 60, such as output control of the laser beam 60, is performed normally, an interval Tf1 from the detection of the last synchronization detection signal in the first frame to the detection of the first synchronization detection signal in the second frame is the same as the intervals Tf2, Tf3, . . . . Hereinafter, between the plurality of frames, intervals Tf1, Tf2, Tf3, . . . from the detection of the last synchronization detection signal in the first frame to the detection of the first synchronization detection signal in the next frame are collectively referred to as the inter-frame synchronization interval Tf (third time interval). The control device 83 monitors the inter-frame synchronization interval Tf, to determine whether the scanning processing of the laser beam 60, the output processing of the laser beam 60, and the like, normally operates.

The lower part in FIG. 8 illustrates five rising edges of the PD signal in the third frame and five synchronization detection signals corresponding to the five rising edges. In this example, the filters 61A, 61B, and 61C are not switched; therefore, when the scanning speed of the laser beam 60 is constant and the output of the laser beam 60 is constant, the light amount of the laser beam 60 emitted to the photosensor 75 is constant. At this time, synchronization pulse widths Tw1, Tw2, Tw3, Tw4, and Tw5 of the synchronization detection signal are constant.

Hereinafter, the synchronization pulse widths Tw1, Tw2, Tw3, Tw4, Tw5, and the like of the synchronization detection signal may be collectively referred to as a sync pulse width Tw (first time interval). Furthermore, intervals Tl1, Tl2, Tl3, and Tl4 between the falling edges (light detection timings) of two temporally adjacent synchronization detection signals within the third frame are also constant. Hereinafter, the intervals Tl 1, Tl 2, Tl 3, Tl 4, and the like between the falling edges of the synchronization detection signal within one frame may be collectively referred to as an intra-frame synchronization interval Tl (second time interval).

Figure 9:
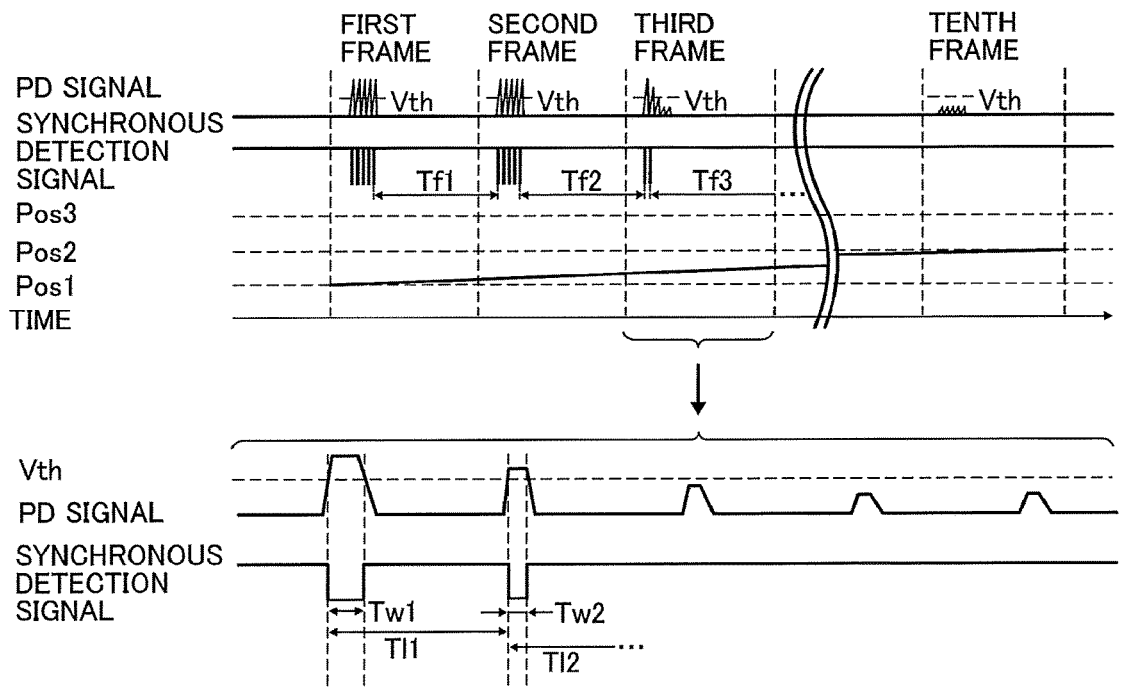
FIG. 9 is a timing chart illustrating a PD signal and a synchronization detection signal in a case where the position of the filter unit shifts from Pos1 to Pos2 in a first example of the embodiment.

FIG. 9 is a diagram illustrating a PD signal and a synchronization detection signal in a case where the position of the filter unit 61 shifts from Pos1 to Pos2 in the first example of the embodiment. Pos1 is a position where the laser beam 60 passes through the first filter 61A, and Pos2 is a position where the laser beam 60 passes through the second filter 61B (see FIG. 3). That is, FIG. 9 illustrates a case where the position of the filter unit 61 shifts so that the light amount of the laser beam 60 emitted to the photosensor 75 decreases. The first example indicates a case where the shift is made from Pos1 to Pos2 over 10 frames and the laser beam 60 passes through the boundary portion 91 between the first filter 61A and the second filter 61B in the third frame, and a case where the potential of the PD signal is lower than the threshold potential Vth when the laser beam 60 passes through the boundary portion 91.

The upper part in FIG. 9 illustrates that a state where the potential of the PD signal abruptly decreases to become smaller than the threshold potential Vth in the third frame and then the potential is lower than the threshold potential Vth is maintained until a tenth frame. At this time, after the inter-frame synchronization intervals Tf1 and Tf2 of the first frame and the second frame are detected, inter-frame synchronization intervals Tf3, . . . of the third and subsequent frames are not detected. This is because the synchronization detection signal is not detected after the fourth frame.

The lower part in FIG. 9 illustrates changes in the PD signal and the synchronization detection signal in the third frame including the boundary timing at which the laser beam 60 has passed through the boundary portion 91. In this example, among the five rising edges of the PD signal in the third frame, each potential of the first and second rising edges is equal to or larger than the threshold potential Vth, and each potential of the third and subsequent rising edges is smaller than the threshold potential Vth.

Therefore, two synchronization detection signals corresponding to the first and second rising edges of the PD signal are detected; however, the synchronization detection signal corresponding to the third and subsequent rising edge of the PD signal is not detected. Therefore, although the first intra-frame synchronization interval Tl1 is detected, the second intra-frame synchronization interval Tl2, . . . is not detected.

Furthermore, the second synchronization pulse width Tw2 of the synchronization detection signal is smaller than the first synchronization pulse width Tw1. This is because the potential of the second rising edge of the PD signal is smaller than the potential of the first rising edge, a time during which the potential of the second rising edge of the PD signal is equal to or larger than the threshold potential Vth is shorter than a time during which the potential of the first rising edge of the PD signal is equal to or larger than the threshold potential Vth.

As described above, in the first example illustrated in FIG. 9, the control device 83 monitors whether or not the change in the synchronization pulse width Tw, the intra-frame synchronization interval Tl, or the inter-frame synchronization interval Tf satisfies the following conditions (decreasing boundary condition), which are observed at the time of switching the filter in the direction in which the transmittance decreases. The control device 83 can then determine the boundary timing at which the laser beam 60 has passed through the boundary portion 91 and the boundary frame (third frame in the present example) including the boundary timing in the process of shifting from Pos1 to Pos2.

Examples of such condition include:
1) the synchronization pulse width Tw gradually decreases, thereby eventually becoming undetectable;
2) after the intra-frame synchronization interval Tl is found at least once, the intra-frame synchronization interval Tl is finally not detected; and
3) after the inter-frame synchronization interval Tf is detected at least once within a shifting period (10 frames) from Pos1 to Pos2, the inter-frame synchronization interval Tf is finally not detected.

It should be noted that the determination may be made based not only on whether or not all of the above conditions are satisfied but also on whether or not a part of the above conditions is satisfied. Furthermore, a condition other than the above may be added, as long as the condition indicates the time of switching the filter in the direction in which the transmittance decreases.

Figure 10:
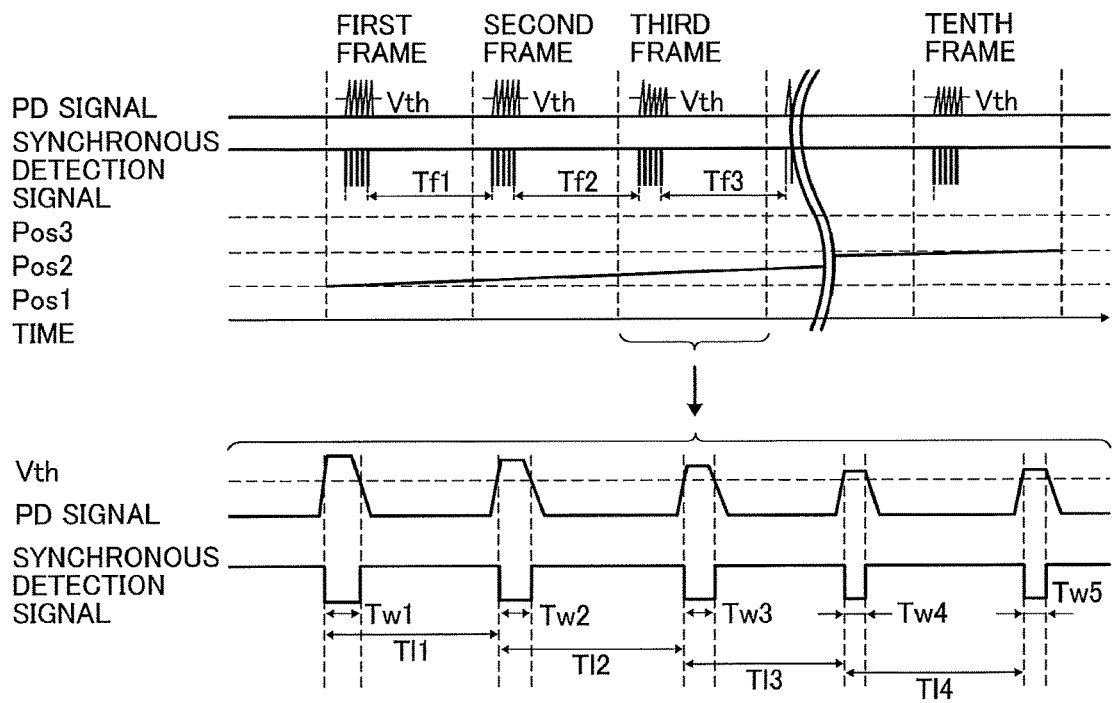
FIG. 10 is a timing chart illustrating a PD signal and a synchronization detection signal in a case where the position of the filter unit shifts from Pos1 to Pos2 in a second example of the embodiment.

FIG. 10 is a timing chart illustrating a PD signal and a synchronization detection signal in a case where the position of the filter unit 61 shifts from Pos1 to Pos2 in the second example of the embodiment. The second example differs from the first example illustrated in FIG. 9 in that the potential of the PD signal maintains the threshold potential Vth or more when the laser beam 60 passes through the boundary portion 91.

The upper part of FIG. 10 illustrates a state where the potential of the PD signal decreases in the third frame, but the potential of the PD signal maintains the threshold potential Vth or more from the third frame to the tenth frame. At this time, all the inter-frame synchronization intervals Tf1 to Tf9 within the shifting period (10 frames) from Pos1 to Pos2 are detected, but the inter-frame synchronization interval Tf varies before and after the boundary frame. In this example, a difference occurs between the inter-frame synchronization interval Tf3 corresponding to the third frame and the inter-frame synchronization interval Tf2 corresponding to the second frame.

The lower part in FIG. 10 illustrates changes in the PD signal and the synchronization detection signal in the third frame including the transmission timing at which the laser beam 60 has passed through the boundary portion 91. In this example, although the potential decreases at the third rising edge of the five rising edges of the PD signal in the third frame, the third and subsequent potentials maintain the threshold potential Vth or more. Therefore, five synchronization detection signals corresponding to the first to fifth rising edges of the PD signal are detected, and the first to fourth intra-frame synchronization intervals Tl1 to Tl4 are detected. At this time, the first to fourth synchronization pulse widths Tw1 to Tw4 in the synchronization detection signal gradually decrease, and the fourth and fifth sync pulse widths Tw4 and Tw5 are substantially the same value. Since the potentials of the four first to fourth rising edges in the PD signal are gradually decreased, a time during which the potentials of the first to fourth rising edges of the PD signal are equal to or larger than the threshold potential Vth gradually shortens. Since the third and fourth synchronization pulse widths Tw3 and Tw4 are smaller than the first and second synchronization pulse widths Tw1 and Tw2, the second and third intra-frame synchronization intervals Tl2 and Tl3 are larger than the first frame synchronization interval Tl1.

As described above, in the second example illustrated in FIG. 10, the control device 83 monitors whether or not the change in the synchronization pulse width Tw, the intra-frame synchronization interval Tl, or the inter-frame synchronization interval Tf satisfies the following conditions (decreasing boundary condition), which are observed at the time of switching the filter in the direction in which the transmittance decreases. Accordingly, the control device 83 can determine the boundary timing at which the laser beam 60 has passed through the boundary portion 91 and the boundary frame (third frame in the present example) including the boundary timing in the process of shifting from Pos1 to Pos2.

Examples of such condition include:
1) the synchronization pulse width Tw gradually decreases;
2) the intra-frame synchronization interval Tl gradually increases; and
3) the inter-frame synchronization interval Tf varies within the shifting period (10 frames) from Pos1 to Pos2.

It should be noted that the determination may be made based not only on whether or not all of the above conditions are satisfied but also on whether or not a part of the above conditions is satisfied. Furthermore, a condition other than the above may be added, as long as the condition indicates the time of switching the filter in the direction in which the transmittance decreases.

Figure 11:
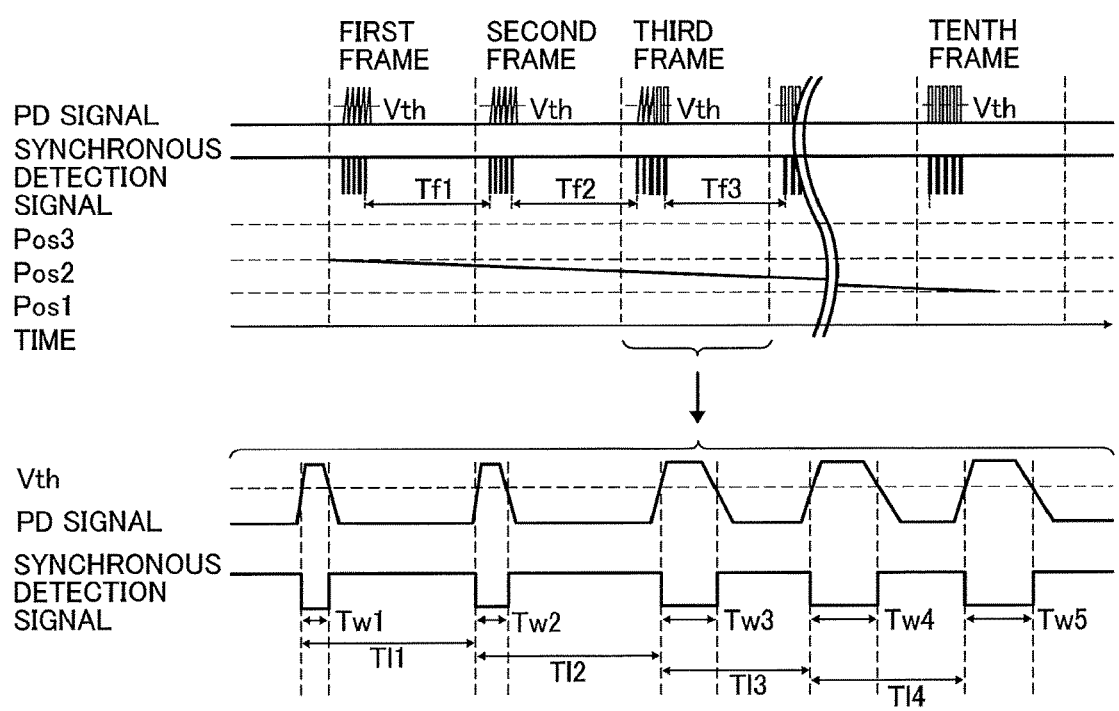
FIG. 11 is a timing chart illustrating a PD signal and a synchronization detection signal in a case where the position of the filter unit shifts from Pos2 to Pos1 in the embodiment.

FIG. 11 is a timing chart illustrating a PD signal and a synchronization detection signal in a case where the position of the filter unit 61 shifts from Pos2 to Pos1 in the embodiment. That is, FIG. 11 illustrates a case where the position of the filter unit 61 shifts so that the light amount of the laser beam 60 emitted to the photosensor 75 increases. In addition, this example is a case where the shifting is made from Pos2 to Pos1 over 10 frames and the laser beam 60 passes through the boundary portion 91 between the first filter 61A and the second filter 61B in the third frame.

The upper part and the lower part of FIG. 11 illustrate that the potential of the PD signal increases in the third frame and the third synchronization pulse width Tw3 of the synchronization pulse width is larger than the first and second synchronization pulse widths Tw1 and Tw2. In addition, the fourth and fifth synchronization pulse widths Tw4 and Tw5 are larger than the third synchronization pulse width Tw3.

Accordingly, the third and subsequent intra-frame synchronization intervals Tl3 and Tl4 are smaller than the first and second intra-frame synchronization intervals Tl1 and Tl2. Furthermore, the inter-frame synchronization interval Tf varies before and after the boundary frame. In this example, a difference occurs between the inter-frame synchronization interval Tf3 corresponding to the third frame and the inter-frame synchronization interval Tf2 corresponding to the second frame.

As described above, in the example illustrated in FIG. 11, the control device 83 monitors whether or not the change in the synchronization pulse width Tw, the intra-frame synchronization interval Tl, or the inter-frame synchronization interval Tf satisfies the corresponding condition (increasing boundary condition), which are to be observed at the time of switching the filter in the direction in which the transmittance increases. Therefore, the control device 83 can determine the boundary timing at which the laser beam 60 has passed through the boundary portion 91 and the boundary frame (third frame in the present example) including the boundary timing in the process of shifting from Pos2 to Pos1.

Examples of such condition include:
1) the synchronization pulse width Tw gradually increases;
2) the intra-frame synchronization interval Tl gradually decreases; and
2) the inter-frame synchronization interval Tf varies within the shifting period (10 frames) from Pos2 to Pos1.

It should be noted that the determination may be made based not only on whether or not all of the above conditions are satisfied but also on whether or not a part of the above conditions is satisfied. Furthermore, a condition other than the above may be added, as long as it indicates the time of switching the filter in the direction in which the transmittance increases.

As described above, based on the characteristics of the temporal change in the light amount of the laser beam 60 detected by the sensor 15 (the photosensor 75), it is possible to determine the boundary timing at which the laser beam 60 has passed through the boundary portions 91 and 92.

More specifically, in the present embodiment, by monitoring a change in the inter-frame synchronization interval Tf, the synchronization pulse width Tw, or the intra-frame synchronization interval Tl, and by determining whether or not the change conforms to a predetermined condition, the boundary timing and the boundary frame including the boundary timing can be determined.

Furthermore, it is possible to determine whether the switching of the performed filter is switching to the direction in which the light amount decreases or switching to the direction in which the light amount increases.

Note that the condition for determining the boundary timing or the boundary frame (the decreasing boundary condition and the increasing boundary condition) as described above is an example and is not limited to the above.

The condition for determining the boundary timing or the boundary frame varies depending on equipment, environment, and the like to be used, and is investigated and set in advance.

Furthermore, in the present embodiment, the determining area 23 is arranged on the upstream side in the scanning direction with respect to the image forming area 22, but the position of the determining area 23 is not limited thereto. For example, the determining area 23 may be arranged on the downstream side in the scanning direction with respect to the image forming area 22.

A control program for controlling the control device 83 (controller 17) can be provided by being incorporated in a ROM or the like inside the control device 83 in advance. In addition, the control program is recorded in a computer-readable recording medium such as a CD-ROM, a flexible disk (FD), a CD-R, a digital versatile disk (DVD), and the like in a file in installable format or executable format. Alternatively, the control program may be stored on a computer connected to a network such as the Internet and provided by being downloaded via the network. Furthermore, the control program may be provided or distributed via a network such as an Internet.

Figure 12:
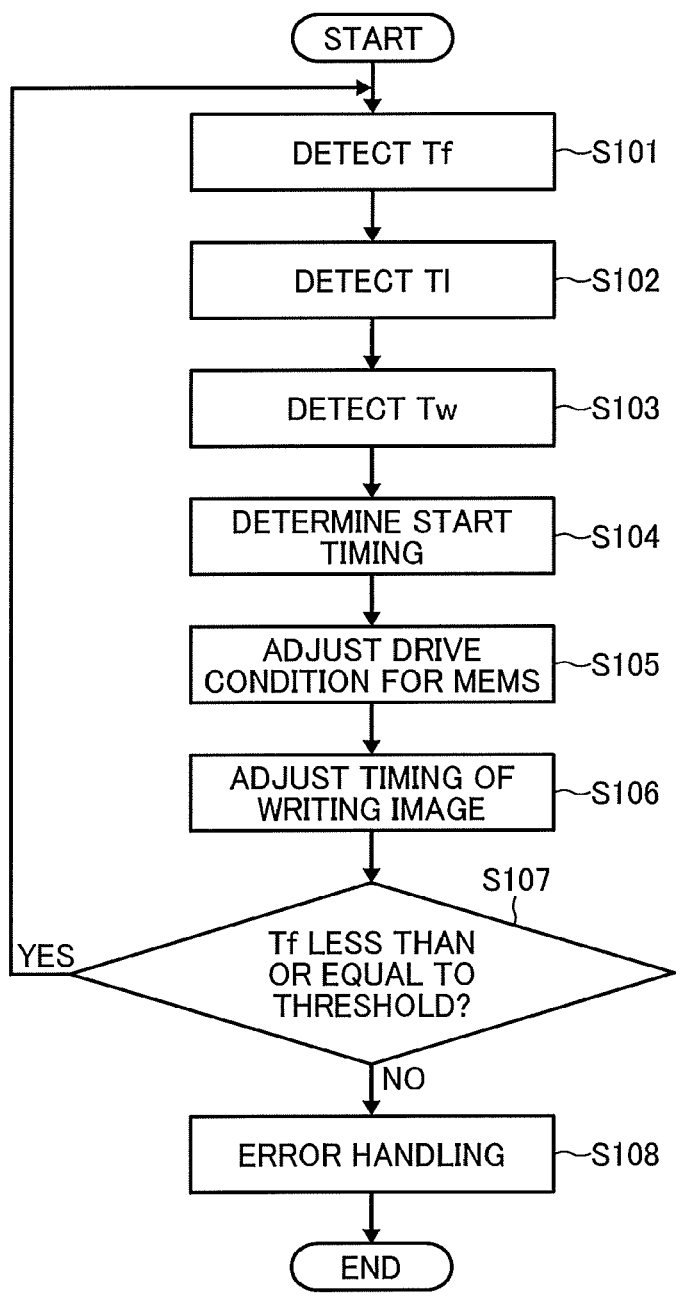
FIG. 12 is a flowchart illustrating synchronization determination processing performed by a synchronization determiner according to the embodiment.

FIG. 12 is a flowchart illustrating a flow of synchronization determination processing performed by the control device 83, operating as the synchronization determiner 18, according to the embodiment. The synchronization determination processing is processing for detecting the synchronization timing of each frame to determine the normality of scanning processing and for optimizing image forming processing in synchronization with the synchronization timing. The synchronization determination processing is mainly performed during the execution of the image forming processing.

Based on the detection result of the sensor 15 acquired while the scan area 21 is repeatedly scanned, the synchronization determiner 18 detects an inter-frame synchronization interval Tf, an intra-frame synchronization interval Tl, and a synchronization pulse width Tw (S101 to S103). The inter-frame synchronization interval Tf, the intra-frame synchronization interval Tl, and the synchronization pulse width Tw detected here are also used in boundary determination processing to be described later.

The synchronization determiner 18 determines the timing at which the laser beam 60 detected by the sensor 15 in the determining area 23, to be the frame synchronization timing (S104). The scanning unit 14 adjusts driving conditions and the like of the MEMS mirror 65 based on the synchronization timing (S105). The controller 17 adjusts image write timing based on start timing (S106).

Thereafter, the synchronization determiner 18 determines whether or not the inter-frame synchronization interval Tf is equal to or smaller than the threshold value (S107). This threshold value may be, for example, a value corresponding to the frame rate.

When the inter-frame synchronization interval Tf is equal to or smaller than the threshold value (S107: Yes), it is determined that the scanning processing is normally performed, and the processing returns to step S101. On the other hand, when the inter-frame synchronization interval Tf is larger than the threshold value (S107: No), it is determined that an abnormality has occurred in the scanning processing, and predetermined error processing is executed (S108).

Figure 13:
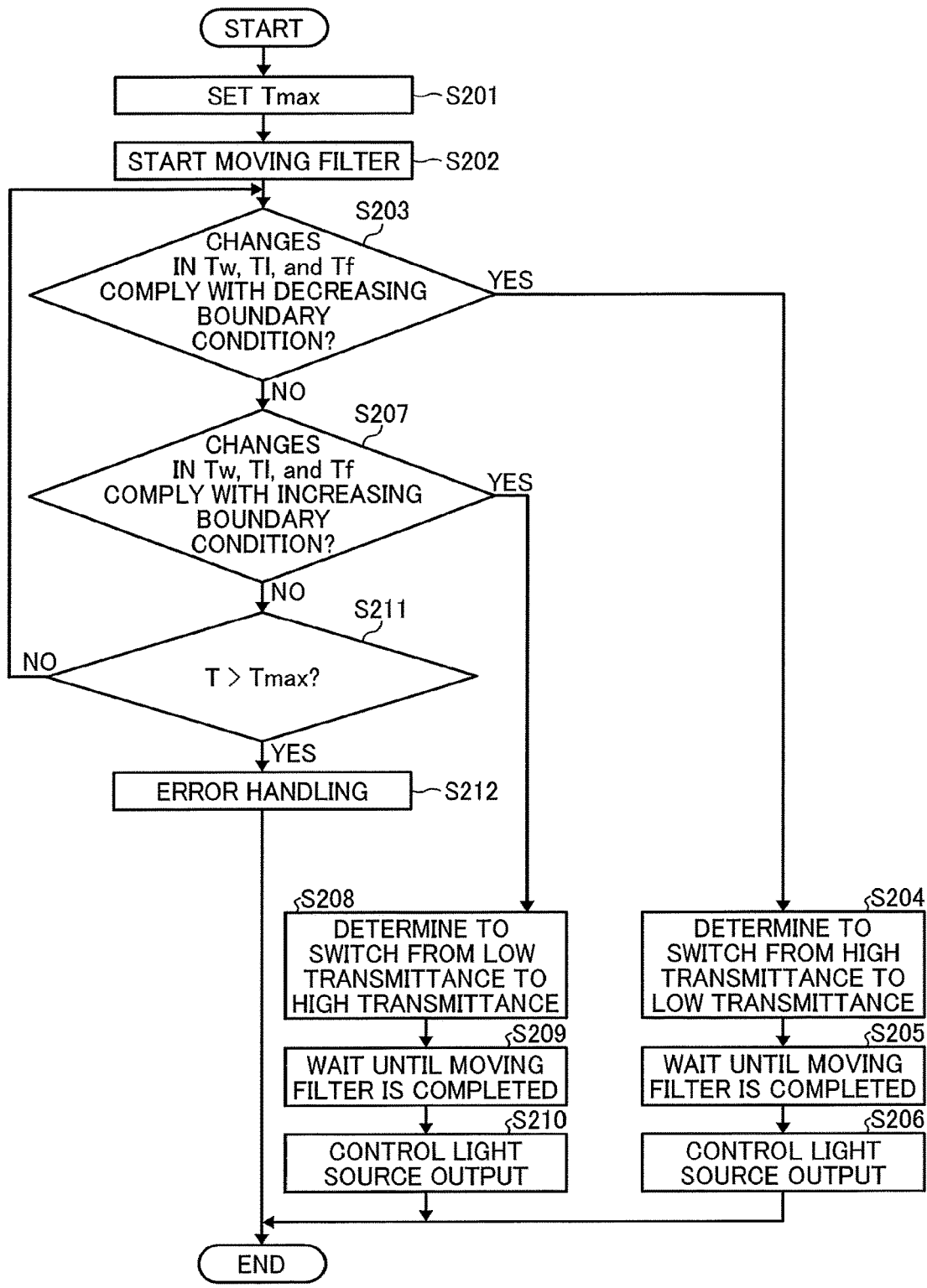
FIG. 13 is a flowchart illustrating boundary determination processing by a boundary determiner according to the embodiment.

FIG. 13 is a flowchart illustrating a flow of boundary determination processing by the control device 83, which operates as the boundary determiner 16, according to the embodiment.

The boundary determination processing is executed when filter switching processing for switching the filters 61A, 61B, and 61C through which the laser beam 60 passes is performed (changing the position of the filter unit 61). In the present embodiment, since the sensor 15 (photosensor 75) is shared by the boundary determination processing and the synchronization determination processing, the synchronization determination processing is stopped when the boundary determination processing is executed.

The boundary determiner 16 sets the maximum time Tmax assigned to the filter switching processing (S201). Although the maximum time Tmax is arbitrarily set, for example, the maximum time Tmax may be the time corresponding to the number of frames (10 frames, for example) until the switching from one filter (for example, the filter 61A) to the other filter (for example, the filter 61B) is completed. Thereafter, the switching unit 13 (driving unit 64) starts to move the filters 61A, 61B, and 61C (S202).

Thereafter, the boundary determiner 16 determines whether or not changes in the inter-frame synchronization interval Tf, the intra-frame synchronization interval Tl, and the synchronization pulse width Tw conform to the decreasing boundary condition (S203).

When the changes in the inter-frame synchronization interval Tf, the intra-frame synchronization interval Tl, and the synchronization pulse width Tw conform to the decreasing boundary condition (S203: Yes), it is determined that switching from a filter having a high transmittance (for example, the filter 61A) to a filter having a low transmittance (for example, the filter 61B) is performed (S204), and processing is waited until the filter unit 61 moves to a predetermined position (for example, Pos2) (S205).

Thereafter, the controller 17 (control device 83) controls the output of the light source 11 (light source unit 50) according to the transmittance of the switched filter (for example, the filter 61B) (S206).

When the changes in the inter-frame synchronization interval Tf, the intra-frame synchronization interval Tl, and the synchronization pulse width Tw do not conform to the decreasing boundary condition (S203: No), the boundary determiner 16 determines whether or not changes in the inter-frame synchronization interval Tf, the intra-frame synchronization interval Tl, and the synchronization pulse width Tw conform to the increasing boundary condition (S207).

When the changes in the inter-frame synchronization interval Tf, the intra-frame synchronization interval Tl, and the synchronization pulse width Tw conform to the increasing boundary condition (S207: Yes), it is determined that switching from a filter having a low transmittance (for example, the filter 61B) to a filter having a high transmittance (for example, the filter 61A) is performed (S208), and processing is waited until the filter unit 61 moves to a predetermined position (for example, Pos1) (S209).

Thereafter, the controller 17 (the control device 83) controls the output of the light source 11 according to the transmittance of the filter (for example, the filter 61A) after switching (S210).

When the changes in the inter-frame synchronization interval Tf, the intra-frame synchronization interval Tl, and the synchronization pulse width Tw do not conform to the increasing boundary condition (S207: No), it is determined whether or not the elapsed time T from the start of the boundary determination processing is larger than the maximum time Tmax (S211).

When the elapsed time T is not larger than the maximum time Tmax (S211: No), step S203 is executed again. When the elapsed time T is larger than the maximum time Tmax (S211: Yes), it is determined that an abnormality has occurred in the filter switching processing, and predetermined error processing is executed (S212).

Figure 14:
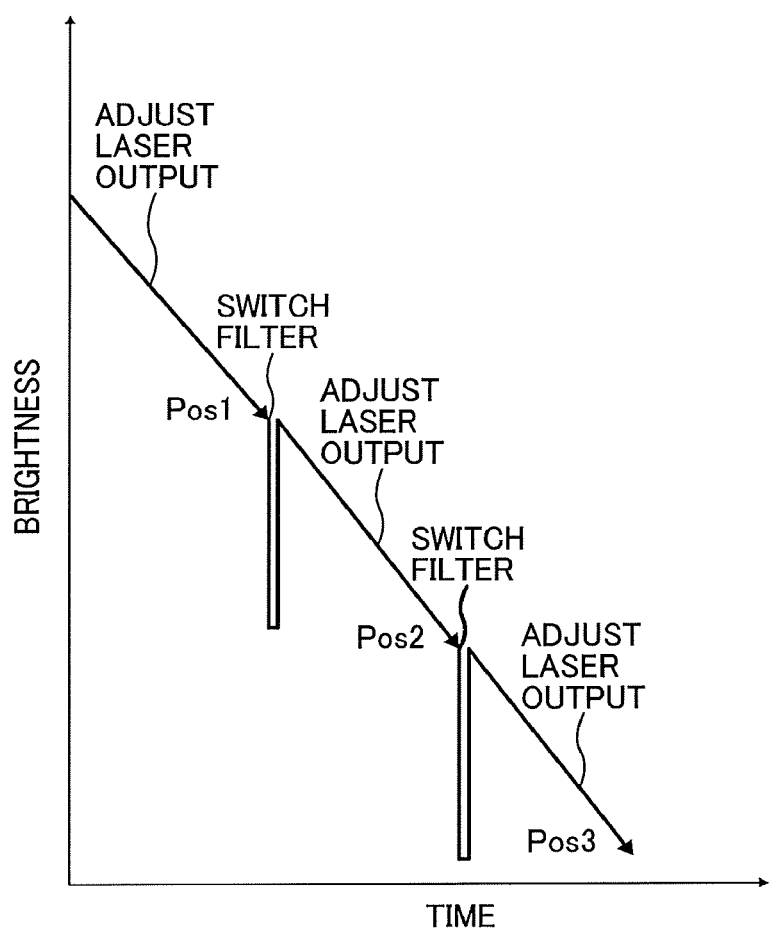
FIG. 14 is a diagram illustrating a change in brightness of an image forming area due to the shifting of the position of the filter unit and the adjustment of the output of a laser beam in the embodiment.

FIG. 14 is a diagram illustrating a change in brightness of the image forming area 22 by shifting the position of the filter unit 61 and adjusting the output of a laser beam 60 in the embodiment.

FIG. 14 illustrates a case where the position of the filter unit 61 shifts from Pos1 to Pos3 via Pos2 and the output of the laser beam 60 is adjusted to gradually lower the brightness of the image forming area 22.

While the filter unit 61 is within the range of Pos1 (the laser beam 60 is passing through the first filter 61A), the output of the laser beam 60 is gradually lowered to gradually lower the brightness of the image forming area 22.

However, at the moment of shifting from Pos1 to Pos2, the laser beam 60 passes through the boundary portion 91 in a state where the output of the laser beam 60 is low, so that the brightness of the image forming area 22 is greatly reduced.

At this time, the control device 83 controls to quickly increase the output of the laser beam 60 according to transmittance of the second filter 61B.

According to the present embodiment, since the boundary timing at which the laser beam 60 passes through the boundary portion 91 can be accurately determined, the control device 83 can quickly increase the output of the laser beam 60 and suppress abrupt fluctuation of the brightness of the image forming area 22 to the minimum.

This is the same in the case of shifting from Pos2 to Pos3, the case of shifting from Pos3 to Pos1 via Pos2, and the like.

As described above, according to the display apparatus 1 of the present embodiment, it is possible to determine the boundary timing based on the characteristics of the temporal change in the light amount of the laser beam 60 detected by the sensor 15.

Specifically, in the present embodiment, by monitoring a change in the inter-frame synchronization interval Tf, the synchronization pulse width Tw, or the intra-frame synchronization interval Tl and determining whether or not the change conforms to a predetermined condition, the boundary timing and the boundary frame including the boundary timing can be determined quickly with high accuracy.

Furthermore, it is possible to determine whether the switching of the performed filter is switching to the direction in which the light amount decreases or switching to the direction in which the light amount increases.

In addition, since it is possible to use the common sensor 15 (not necessarily in common) in the synchronization determination processing and the boundary determination processing, it is possible to avoid an increase in cost, complication of the circuit, and the like.

Figure 15:
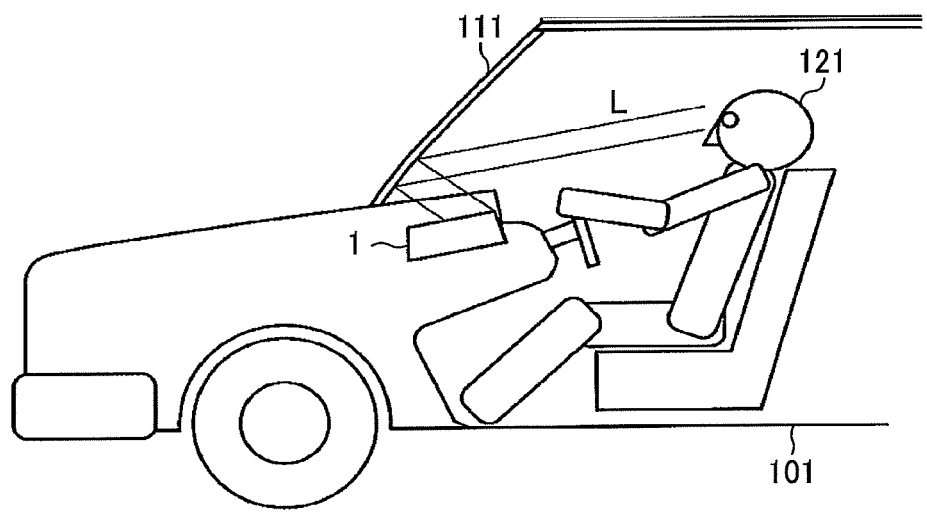
FIG. 15 is a diagram illustrating a configuration of a moving body according to the embodiment.

FIG. 15 is a diagram illustrating a configuration of a moving body 101 according to the embodiment. The moving body 101 according to the present embodiment is a vehicle using the display apparatus 1 according to this embodiment as a heads-up display (HUD) apparatus.

The display apparatus 1 is provided in the dashboard. Projection light L, which is image light emitted from the display apparatus 1, is reflected by the windshield 111, which is a light transmitting/reflecting member, and travels toward a driver 121. As a result, the driver 121 can visually recognize an image including navigation information, speed information, traffic information, and the like as a virtual image. It should be noted that a combiner which is a light transmitting/reflecting member may be provided in a portion inside the windshield 111 (on a dashboard or the like), and the driver 121 may view the virtual image with the projection light L reflected by the combiner.

A vehicle as the moving body 101 is an example of a moving body on which the display apparatus 1 is mounted. The moving body on which the display apparatus 1 is mounted is not limited to the above, and may be, for example, an airplane, a ship, a motorcycle, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A display apparatus comprising:
a light source to emit light;
a dimmer including a plurality of regions having transmittances that are mutually different from one another;
a switcher to switch a region of the dimmer through which the light passes, between the plurality of regions of the dimmer;
a scanner to scan a scan area at a predetermined frame rate with the light, the scan area having a first area in which an image is formed and a second area different from the first area;
a sensor to detect a light amount of the light emitted to the second area; and
a controller to determine a boundary timing at which the light has passed through a boundary portion between two adjacent regions of the dimmer based on characteristics of a temporal change in the detected light amount,
wherein the scan area is part of a screen and the sensor is disposed on the screen.

2. The display apparatus according to claim 1,
wherein the controller further controls an output of the light source so that a light amount of the light emitted to the first area matches the transmittance of the region of the dimmer through which the light passes based on the boundary timing.

3. The display apparatus according to claim 1,
wherein the controller obtains a first time interval in which the light amount detected by the sensor is equal to or larger than a threshold value, and determines the boundary timing based on a change in the first time interval within one frame.

4. The display apparatus according to claim 1,
wherein the controller obtains a light detection timing indicating that the light amount detected by the sensor has become equal to or larger than a threshold value, and determines the boundary timing based on a change in a second time interval, the second time interval being a time interval between two temporally adjacent light detection timings within one frame.

5. The display apparatus according to claim 1,
wherein, after the light amount equal to or larger than a threshold value is no longer detected in a first frame of a plurality of frames, the controller determines the boundary timing based on a change in a third time interval until the light amount equal to or larger than the threshold value is detected in a second frame generated next to the first frame.

6. The display apparatus according to claim 1, wherein the second area is located on an upstream side in a scanning direction with respect to the first area.

7. The display apparatus according to claim 1, wherein the controller determines a boundary frame including the boundary timing.

8. The display apparatus according to claim 1, wherein the controller further determines a synchronization timing of each frame based on a detection result by the sensor.

9. A moving body comprising the display apparatus according to claim 1.

10. A display method comprising:
   emitting light;
   switching between a plurality of regions of a dimmer to cause one of the plurality of regions to be disposed on an optical path through which the light passes, the regions having transmittances that are mutually different from one another;
   scanning a scan area at a predetermined frame rate with the light, the scan area having a first area in which an image is formed and a second area different from the first area, the scan area being part of a screen;
   detecting a light amount of the light emitted to the second area on the screen; and
   determining a boundary timing at which the light has passed through a boundary portion between two adjacent regions of the dimmer based on characteristics of a temporal change in the detected light amount.

11. A non-transitory recording medium which, when executed by one or more processors, cause the processors to perform a display method comprising:
   emitting light;
   switching between a plurality of regions of a dimmer to cause one of the plurality of regions to be disposed on an optical path through which the light passes, the regions having transmittances that are mutually different from one another;
   scanning a scan area at a predetermined frame rate with the light, the scan area having a first area in which an image is formed and a second area different from the first area, the scan area being part of a screen;
   detecting a light amount of the light emitted to the second area on the screen; and
   determining a boundary timing at which the light has passed through a boundary portion between two adjacent regions of the dimmer based on characteristics of a temporal change in the detected light amount.

* * * * *